United States Patent
Schindler et al.

(10) Patent No.: US 7,094,859 B2
(45) Date of Patent: Aug. 22, 2006

(54) CROSS-LINKABLE POLYMER BLENDS CONTAINING ALKOXYSILANE-TERMINATED POLYMERS

(75) Inventors: Wolfram Schindler, Tüssling (DE); Uwe Scheim, Coswig (DE); Bernd Pachaly, Mehring (DE)

(73) Assignee: Consortium fuer Elektrochemische Industrie GmbH, Munich (DE)

( * ) Notice: Subject to any disclaimer, the term of this patent is extended or adjusted under 35 U.S.C. 154(b) by 17 days.

(21) Appl. No.: 10/501,214

(22) PCT Filed: Dec. 19, 2002

(86) PCT No.: PCT/EP02/14567

§ 371 (c)(1),
(2), (4) Date: Jul. 12, 2004

(87) PCT Pub. No.: WO03/059981

PCT Pub. Date: Jul. 24, 2003

(65) Prior Publication Data

US 2005/0119421 A1    Jun. 2, 2005

(30) Foreign Application Priority Data

Jan. 17, 2002 (DE) ................................. 102 01 703

(51) Int. Cl.
*C08G 77/60* (2006.01)

(52) U.S. Cl. .................... 528/21; 528/28; 528/29; 528/35; 528/38

(58) Field of Classification Search ...................... None
See application file for complete search history.

(56) References Cited

U.S. PATENT DOCUMENTS

| 3,971,751 A | 7/1976 | Isayama et al. |
| 5,254,657 A | 10/1993 | Inoue |
| 6,790,903 B1 * | 9/2004 | Majolo et al. .............. 524/506 |

FOREIGN PATENT DOCUMENTS

| DE | 2445220 | 4/1976 |
| DE | 2543966 | 4/1977 |
| DE | 198 49 817 A1 | 5/2000 |
| EP | 269819 | 6/1988 |
| EP | 0931800 | 7/1999 |
| WO | WO 96/34030 | 10/1996 |
| WO | WO 00/37533 | 6/2000 |
| WO | WO 02/077072 A1 * | 10/2002 |

OTHER PUBLICATIONS

English Derwent Abstract corresponding to DE 198 49817 [AN 2000-351610].
English Derwent Abstract corresponding to DE 254 3966 [AN 1977-25423Y].
English Derwent Abstract corresponding to DE 244 5220 [AN 1976-26426X].

* cited by examiner

*Primary Examiner*—Marc S. Zimmer
(74) *Attorney, Agent, or Firm*—Brooks Kushman P.C.

(57) ABSTRACT

Alkoxysilane-terminated polymers prepared by reacting an isocyanatoalkoxysilane, preferably an isocyanatodialkyalkoxysilane, with an isocyanate-reactive prepolymer, can provide chain extension even when a monoalkoxy-functional silane, while retaining suitable reactivity profiles. The products are useful in sealants, caulks, coatings, and moldings.

19 Claims, No Drawings

CROSS-LINKABLE POLYMER BLENDS CONTAINING ALKOXYSILANE-TERMINATED POLYMERS

BACKGROUND OF THE INVENTION

1. Field of the Invention

The invention relates to one-component blends comprising alkoxysilane-terminated polymers which cure at room temperature under the action of atmospheric moisture to form low-modulus compositions.

2. Description of the Related Art

Polymer systems which possess reactive alkoxysilyl groups have been known for a long time. In the presence of atmospheric moisture these alkoxysilane-terminated polymers are capable even at room temperature of undergoing condensation with one another, with the elimination of the alkoxy groups. Depending on the amount and structure of the alkoxysilane groups, the condensation products are principally long-chain polymers (thermoplastics), relatively wide-meshed three-dimensional networks (elastomers) or else highly crosslinked systems (thermosets).

The polymers concerned may be either alkoxysilane-terminated polymers with an organic backbone, such as polyurethanes, polyesters, polyethers, etc. described inter alia in EP-A-269 819, EP-A-931 800, WO 00/37533, U.S. Pat. No. 3,971,751 and DE-A-198 49 817, or polymers whose backbone is composed wholly or at least partly of organosiloxanes, described inter alia in WO 96/34030 and U.S. Pat. No. 5,254,657.

In accordance with the countless possibilities for designing such silane-terminated polymer systems, the properties of the uncrosslinked polymers or of the polymer-containing mixtures and also the properties of the crosslinked compositions (hardness, elasticity, etc.) can be adjusted. Correspondingly diverse, therefore, are the possible uses of such silane-terminated polymer systems. For example, they may be used for preparing elastomers, sealants, adhesives, elastic adhesion systems, rigid or flexible foams, and a very wide variety of coating systems, and in the medical sphere, for example for impression compounds in the dental sector. These products can be applied in any form, such as by brushing, spraying, pouring, pressing, trowelling, etc.

In many systems a substantial disadvantage lies in the contradictory effect of chain length or molecular weight of the polymer used and the processing properties in terms of the viscosity. High molecular weights are not only of interest owing to the higher mechanical strength associated with them but are also an important prerequisite for the preparation of low-modulus elastomers, as are required in particular in sealants. Where polymers of lower viscosity can be used in such compositions, the adjustment of the processing properties becomes much simpler and more flexible.

For example, a silicone polymer must be used with a viscosity which is as high as possible in order for the cured product to achieve the right properties in terms of ultimate tensile strength and elasticity for use in construction sealants. State of the art here is a polymer having a viscosity of at least 80 Pas. Such a polymer, however, gives rise to adverse properties in the paste, such as stringing, poor smoothability, and high plasticizer content. For setting these properties the ideal would be a polymer having a viscosity of not more than 20 Pas.

This tendency is even more pronounced in the context of the use of silane-terminated polyurethanes. Here, it is well-nigh impossible to prepare low-modulus compositions without significantly impairing the mechanical properties, generally as a result of additions of plasticizer.

A great advantage, therefore, would be alkoxysilane-terminated polymer systems which on curing bring about not only crosslinking but also a chain extension of the polymers. In order to reduce the crosslinking densities it is common to incorporate difunctional silanes into the polymers. Since the reactivity of such compositions is generally much lower, it is necessary to raise the amount of catalysts (usually containing tin) sharply. In this context it would be particularly advantageous to be able to use not only difunctional silanes but also monofunctional silanes, which are able to bring about chain extension exclusively. The known monofunctional silane end groups, based on silanes having trimethylene spacers between the organic functional unit and the silicon atom, however, are so slow to react that they generally function as "dead" chain ends.

DE-A 2543966 and DE-A 2445220 describe the use of polymers containing monofunctional alkoxysilane endgroups for preparing one- and two-component polysiloxane-polyurethane copolymers. Here, isocyanate-terminated polyurethanes are reacted with aminomethylmonoalkoxysilanes (especially cyclohexylaminomethyldimethylethoxysilane) and the polymers obtained are crosslinked with crosslinker units and OH-terminated polysiloxanes to form elastomers.

One of the disadvantages of this system is the fact that the reaction is tied to the use of isocyanate-terminated prepolymers. Polymers of this kind are normally prepared by reacting excess diisocyanates with polyols. As a result of the incorporation of the urethane groups, but in particular as a result of the large number of side reactions occurring when an excess of isocyanate is used (biuret formation, formation of urea bonds through hydrolysis of the NCO groups and condensation with further NCO groups, etc.), this generally leads to very viscous polymers. The incorporation of the aminosilanes to form urea groups reinforces this negative effect. To compensate for it these polymers must usually be synthesized with relatively low molecular weights. That, however, adversely affects the elastic behavior of the cured products. In the case of silanes with a functionality of two or three, only very brittle compositions of high modulus are generally obtained. The incorporation of monoalkoxy endgroups is certainly advantageous here. However, the modulus of these compositions is always very high and so presents problems for applications in the construction sealant sector.

As depicted in EP-A-931800, the incorporation of isocyanatosilanes results in a marked improvement in the properties of the sealants as compared with corresponding polymers prepared by way of aminosilanes. However, it has not proven possible to date to use monofunctional silanes here, since the silanes customary at present, with trimethylene spacers, as already mentioned above, have a reactivity which is much too low.

SUMMARY OF THE INVENTION

It has now been surprisingly discovered that alkoxysilane-terminated polymers prepared by reacting an isocyanatoalkoxysilane, preferably an isocyanatodialkylalkoxysilane, with an isocyanate-reactive prepolymer, can provide chain extension even when they comprise monoalkoxyfunctional silanes, while retaining suitable reactivity profiles. The cured products exhibit higher tensile strength and elongation, and are both more flexible and softer, than comparable products prepared from trialkoxysilane-terminated polymers.

DETAILED DESCRIPTION OF THE PREFERRED EMBODIMENT(S)

The invention provides crosslinkable polymer blends which comprise alkoxysilane-terminated polymers (A) having endgroups of the general formula (1)

the polymers (A) being obtainable by reacting prepolymers (A1) containing reactive HO, HN(R$^3$) or HS endgroups, with isocyanatosilanes of the general formula (2)

where

L is a divalent linking group selected from —O—CO—NH—, —N(R$^3$)—CO—NH—, —S—CO—NH—, R$^1$ is an optionally halogen-substituted alkyl, cycloalkyl, alkenyl or aryl radical having 1–10 carbon atoms, R$^2$ is an alkyl radical having 1–6 carbon atoms or an ω-oxyalkylalkyl radical having a total of 2–10 carbon atoms, R$^3$ is hydrogen, an optionally halogen-substituted cyclic, linear or branched C$_1$ to C$_{18}$ alkyl or alkenyl radical or a C$_6$ to C$_{18}$ aryl radical, and a is an integer from 0 to 2, with the proviso that the fraction of the endgroups of the general formula (1) where a=2, relative to all the endgroups of the polymers present in the mixture, is from 5% to 100%.

The polymers (A) which possess alkoxysilyl endgroups of the general formula (1) possess a very high reactivity with respect to moisture. Thus it is also possible to incorporate monoalkoxy endgroups and to prepare and process polymer blends which cure at a sufficiently high rate and with sufficiently short tack-free times at room temperature even with small amounts of added heavy metal catalysts or indeed none at all.

It has been found that the hitherto-unexamined isocyanatomethylalkoxysilanes of the general formula (2) can be used together with prepolymers (A1) that possess reactive HO, NH(R$^3$) or SH endgroups, which can be reacted with the isocyanate group, to prepare alkoxysilane-terminated polymers (A) which possess very high curing rates.

Also surprising was the fact that even the isocyanatomethylmonoalkoxysilanes (a=2) are reactive enough to allow moisture-curing compositions with skinning times of less than 15 minutes to be obtained with them.

A further advantage of the use of isocyanatomethylalkoxysilanes of the general formula (2) is that the one-component polymer blends can also be prepared using relatively low molecular mass prepolymers (A1), which as a result are also much more favorably priced, as polymer building blocks; in contrast to the abovementioned aminosilanes it is possible to obtain not only isocyanato-functional systems (NCO-terminated polyurethanes) but also a multiplicity of further polymer systems.

The polymer blends comprising polymers (A) crosslink to form low-modulus elastomers which have relatively high chain lengths and molecular weights and as a result attain higher mechanical strength properties and higher elasticities.

Preferred radicals R$^1$ are methyl, ethyl or phenyl groups, methyl groups being particularly preferred. The radicals R$^2$ are preferably methyl or ethyl groups, while preferred radicals R$^3$ are hydrogen, alkyl radicals having 1–4 carbon atoms, cyclohexyl and phenyl radicals.

The main chains of the alkoxysilane-terminated polymers (A) may be branched or unbranched. Depending on the particular properties desired, both of the uncrosslinked mixture and of the cured composition, the average chain lengths may be adapted arbitrarily. The polymers may be composed of various units. These units are normally polysiloxanes, polysiloxane-urea/urethane copolymers, polyurethanes, polyureas, polyethers, polyesters, polyacrylates and polymethacrylates, polycarbonates, polystyrenes, polyamides, polyvinyl esters or polyolefins such as polyethylene, polybutadiene, ethylene-olefin copolymers or styrene-butadiene copolymers. It is of course also possible to use any desired mixtures or combinations of polymers with different main chains.

Where the prepolymer (A1) is itself composed of two or more building blocks (A11, A12, etc.), it is not absolutely necessary to use these building blocks (A11, A12, etc.) first to prepare the prepolymer (A1), which is subsequently reacted with the silane of the general formula (2) to give the finished polymer (A). Thus it is also possible here to reverse the reaction steps, by first reacting one or more building blocks (A11, A12, etc.) with a silane of the general formula (2) and only then reacting the resultant compounds with the remaining building blocks (A11, A12, etc.) to give the finished polymer (A).

Examples of such prepolymers (A1) composed of building blocks A11, A12 are HO— and HN(R$^3$)-terminated polyurethanes and polyureas, which can be prepared from polyisocyanates (building block A11) and polyols (building block A12).

Preferred building blocks (A11, A12, etc.) for preparing the polymers (A), besides the silanes of the general formula (2), are OH-terminated polyols, monomeric alcohols/amines having at least two OH/NH functions and/or hydroxyalkyl- or aminoalkyl-terminated polydiorganosiloxanes and also diisocyanates or polyisocyanates.

Particularly suitable polyols for preparing the polymers (A) are aromatic and aliphatic polyesterpolyols and polyetherpolyols, such as are widely described in the literature. In principle, however, it is possible to use all polymeric, oligomeric or else monomeric alcohols having two or more OH functions.

As hydroxyalkyl- or aminoalkyl-terminated polysiloxanes it is preferred to use compounds of the general formula (3)

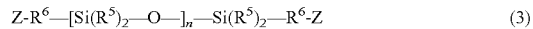

in which

R$^5$ is a hydrocarbon radical having from 1 to 12 carbon atoms, preferably methyl radicals, R$^6$ is a branched or unbranched hydrocarbon chain having 1–12 carbon atoms, preferably trimethylene, and n is a number from 1 to 3000, preferably a number from 10 to 1000, and Z means HO or HN(R$^3$), where R$^3$ can be as defined above.

Examples of customary diisocyanates are diisocyanatodiphenylmethane (MDI), both in the form of monomeric or technical-grade MDI and in the form of pure 4,4'- and/or 2,4'-isomers or mixtures thereof, tolylene diisocyanate in the form of its various regioisomers, diisocyanatonaphthalene, isophorone diisocyanate, or else hexamethylene diisocyanate. Examples of polyisocyanates are polymeric methylenediphenyl 4,4'-diisocyanate, triphenylmethane triisocyanate or biuret triisocyanates.

The fraction of the endgroups of the general formula (1) where a=2, relative to all endgroups in the polymers present in the polymer mixture, is preferably at least 25%, more preferably at least 50% and in particular at least 75%.

Besides the polymers (A) whose endgroups correspond to the general formula (1) it is also possible for the mixture to include other polymers (X) which contain other endgroups. Examples of other polymers (X) are, in the case of the polydiorganosiloxanes, preferably trimethylsilyl-terminated polymethylsiloxanes or certain aromatics-free hydrocarbons. In the case of the pure organic polymer systems they are phthalates, adipates, alkylsulfonates or, again, aromatics-free hydrocarbons. These polymers preferably serve as plasticizers and for setting the rheology of the compositions.

Preferably at least 60% by weight, with particular preference at least 80% by weight, in particular at least 90% by weight of polymers (A) are present in a mixture, based on the sum of the polymers (A) and (X).

The polymer mixtures may further comprise catalysts as component (B). Catalysts in this context are compounds capable of catalyzing the curing of the polymer blend. In particular the catalysts in question are organic heavy metal compounds. Heavy metals in this context are all metals apart from the light metals, i.e. apart from the alkali metals and alkaline earth metals and also aluminum and scandium. The polymer blends are preferably free from catalysts containing tin, especially organotin compounds, with the absence of catalysts containing titanium likewise being preferred. With particular preference the polymer blends are free from any catalysts containing heavy metals.

In the polymer blends it is preferably also possible to use, as component (B), organic amino compounds as basic catalysts. Examples are aminosilanes, such as aminopropyltrimethoxysilane, aminopropyltriethoxysilane, aminomethyltrimethoxysilane, aminomethylmethyltrimethoxysilane, N-(2-aminoethyl)aminopropyltrimethoxysilane and aliphatic hydrocarbon amines such as triethylamine, tributylamine, 1,4-diazabicyclo[2.2.2]octane, N,N-bis-(N,N-dimethyl-2-aminoethyl)methylamine, N,N-dimethylcyclohexylamine, N,N-dimethylphenylamine and N-ethylmorpholine.

The catalysts are preferably used in concentrations of 0.01–10% by weight, in particular from 0.05 to 3% by weight, in the polymer blend. The various catalysts may be used either in pure form or as mixtures of different catalysts.

As a further component (C) the polymer blends may include what are known as crosslinker silanes. These are organofunctional silanes or condensates thereof having at least three alkoxy groups, especially methoxy and ethoxy groups, per molecule. Examples of such trifunctional silanes are methyltrimethoxysilane, ethyltrimethoxysilane, phenyltrimethoxysilane, vinyltrimethoxysilane and partial hydrolysates thereof. The crosslinker silanes may be present in amounts of 0.01–20% by weight, preferably 1.0–5.0% by weight, in the finished polymer blend.

As further components the polymer blends may include auxiliaries known per se, such as fillers, water scavengers, reactive diluents, adhesion promoters, thixotropic agents, light stabilizers, fungicides, flame retardants, pigments, etc., such as are known for use in conventional alkoxy-crosslinking one-component compositions. Such additions are generally vital in order to produce the particular profiles of properties that are desired both in the uncrosslinked polymer blends and in the cured compositions.

A very wide variety of applications exists for the polymer blends in the fields of adhesives, sealants, including joint sealants, and surface coatings and also for producing moldings.

The blends are suitable for a wide variety of substrates, such as mineral substrates, metals, plastics, glass and ceramic, for example.

The polymer blends can be employed both in pure form and in the form of solutions or dispersions.

All of the above symbols in the above formulae have their definitions in each case independently of one another. In all formulae the silicon atom is tetravalent.

In the examples below, unless indicated otherwise, all amounts and percentages are by weight, all pressures are 0.10 MPa (abs.) and all temperatures are 20° C.

The skinning times were determined by testing the surface with a metal spatula. The skinning time is the time at which, when the surface is contacted, either the spatula no longer adheres or, if it does adhere slightly, stringing has ceased.

EXAMPLE 1

Preparation of isocyanatomethyltrimethoxysilane: Methylcarbamatomethyltrimethoxysilane is pumped in a stream of argon gas into a quartz pyrolysis tube packed with quartz wool. The temperature in the pyrolysis tube is between 420 and 470° C. At the end of the heated section, the crude product is condensed out by means of a condenser and collected. The yellowish brown liquid is purified by distillation under reduced pressure. The desired product passes over at the top at about 88–90° C. (82 mbar) in a purity of more than 99%, while at the bottom the unreacted carbamate can be reisolated. It is passed back directly to the pyrolysis.

EXAMPLE 2 a) Preparation of isocyanatomethyldimethylmethoxysilane: Methylcarbamatomethyldimethylmethoxysilane is reacted to form the isocyanate by pyrolysis in analogy to Example 1. The yellowish brown liquid is purified by distillation under reduced pressure. The desired product passes over at the top at about 59–60° C. (20 mbar) in a purity of more than 99%.

b) Preparation of isocyanatomethyldimethylethoxysilane: Methylcarbamatomethyldimethylethoxysilane is reacted to form the isocyanate by pyrolysis in analogy to Example 1 and 2a). The yellowish brown liquid is purified by distillation under reduced pressure. The desired product passes over at the top at about 66–69° C. (20 mbar) in a purity of more than 99%.

Comparative Example C3 (Not According to the Invention)

500 g (11.1 mmol) of α,ω-(3-aminopropyl)polydimethylsiloxane having an average molecular weight of 45 000 g/mol are heated to 80° C. in a heatable laboratory planetary mixer equipped with vacuum pump and are heated to completion in vacuo for 0.5 h. Then 3.9 g (22.2 mmol) of isocyanatomethyltrimethoxysilane are added at 80° C. and stirring is continued for an hour. Complete conversion of the silane is monitored using IR spectroscopy, on the basis of the NCO band.

The silane-terminated polymer obtained is cooled to 25° C. with stirring, 230.0 g of a trimethylsilyl-terminated polydimethylsiloxane having a viscosity of 100 Pas, 20.0 g of methyltrimethoxysilanes and 85.0 g of a hydrophilic pyrogenic silica are added and the mixture is processed within 0.5 h to form a stiff paste. Finally, 8.0 g of 3-(2-aminoethyl)aminopropyltrimethoxysilane, as a further crosslinker and catalyst, are mixed in for 10 minutes.

The paste is applied by knifecoating in a layer thickness of 2 mm to a Teflon plate and is crosslinked to form a silicone rubber under the action of atmospheric moisture. After the mixture has been applied, the tack-free time in air is approximately 5 minutes (23° C., 50% rh). The characteristics of this product are summarized in Table 1.

Comparative Example C4 (Not According to the Invention)

500 g (11.1 mmol) of α,ω-(3-aminopropyl)polydimethylsiloxane having an average molecular weight of 45 000 g/mol are heated to 80° C. in a heatable laboratory planetary mixer equipped with vacuum pump and are heated to completion in vacuo for 0.5 h. Then 4.6 g (22.2 mmol) of isocyanatopropyltrimethoxysilane (Silquest Y-5187 from Crompton) are added at 80° C. and stirring is continued for an hour. Complete conversion of the silane is monitored using IR spectroscopy, on the basis of the NCO band.

The silane-terminated polymer obtained is cooled to 25° C. with stirring, 230.0 g of a trimethylsilyl-terminated polydimethylsiloxane having a viscosity of 100 Pas, 20.0 g of methyltrimethoxysilanes and 85.0 g of a hydrophilic pyrogenic silica are added and the mixture is processed within 0.5 h to form a stiff paste. Finally, 8.0 g of 3-(2-aminoethyl)aminopropyltrimethoxysilane, as a further crosslinker, are mixed in for 10 minutes.

The paste is applied by knifecoating in a layer thickness of 2 mm to a Teflon plate and is crosslinked to form a silicone rubber under the action of atmospheric moisture. After the mixture has been applied, the tack-free time in air is approximately 2 hours (23° C., 50% rh). The characteristics of this product are summarized in Table 1.

EXAMPLE 5

(According to the Invention)

500 g (11.1 mmol) of α,ω-(3-aminopropyl)polydimethylsiloxane having an average molecular weight of 45 000 g/mol are heated to 80° C. in a heatable laboratory planetary mixer equipped with vacuum pump and are heated to completion in vacuo for 0.5 h. Then 3.6 g (22.2 mmol) of isocyanatomethyldimethylmethoxysilane are added at 80° C. and stirring is continued for an hour. Complete conversion of the silane is monitored using IR spectroscopy, on the basis of the NCO band.

The silane-terminated polymer obtained is cooled to 25° C. with stirring, 230.0 g of a trimethylsilyl-terminated polydimethylsiloxane having a viscosity of 100 Pas, 20.0 g of methyltrimethoxysilane and 85.0 g of a hydrophilic pyrogenic silica are added and the mixture is processed within 0.5 h to form a stiff paste. Finally, 20.0 g of 3-(2-aminoethyl) aminopropyltrimethoxysilane, as a further crosslinker and catalyst, are mixed in for 10 minutes.

The paste is applied by knifecoating in a layer thickness of 2 mm to a Teflon plate and is crosslinked to form a silicone rubber under the action of atmospheric moisture. After the mixture has been applied, the tack-free time in air is approximately 25 minutes (23° C., 50% rh). The characteristics of this product are summarized in Table 1.

Comparative Example C6 (Not According to the Invention)

400 g (50.0 mmol) of a polypropylene glycol having an average molecular weight of 8000 g/mol are introduced, dewatered in vacuo at 100° C. for 1 h and polymerized with 12.5 g (56 mmol) of isophorone diisocyanate at 100° C. over the course of 60 minutes. The OH-terminated polyurethane prepolymer obtained is subsequently cooled to 60° C., 19.5 g (110 mmol) of isocyanatomethyltrimethoxysilane are added and the mixture is stirred for 60 minutes until the isocyanate band is no longer present in the IR spectrum. The product is a clear, transparent polymer having a viscosity of 85 Pas.

In a laboratory planetary mixer, the silane-terminated polymer thus prepared is admixed at about 25° C. with 95 g of diisoundecyl phthalate, 20.0 g of methyltrimethoxysilane and 430 g of precipitated, dried chalk (dried beforehand, water content <50 ppm) and processed to form a stiff paste. Finally, 20.0 g of 3-(2-aminoethyl)aminopropyltrimethoxysilane, as a further crosslinker and catalyst, are mixed in for 10 minutes. After the mixture has been applied the tack-free time in air is approximately 5 minutes (23° C., 50% rh). The characteristics of this product are summarized in Table 1.

EXAMPLE 7

(According to the Invention)

400 g (50.0 mmol) of a polypropylene glycol having an average molecular weight of 8000 g/mol are introduced, dewatered in vacuo at 100° C. for 1 h and polymerized with 12.5 g (56 mmol) of isophorone diisocyanate at 100° C. over the course of 60 minutes. The OH-terminated polyurethane prepolymer obtained is subsequently cooled to 60° C., 17.7 g (110 mmol) of isocyanatomethyldimethylmethoxysilane are added and the mixture is stirred for 60 minutes until the isocyanate band is no longer present in the IR spectrum. The product is a clear, transparent polymer having a viscosity of 80 Pas.

In a laboratory planetary mixer, the silane-terminated polymer thus prepared is admixed at about 25° C. with 95 g of diisoundecyl phthalate, 20.0 g of methyltrimethoxysilane and 430 g of precipitated, dried chalk (dried beforehand, water content <50 ppm) and processed to form a stiff paste. Finally, 20.0 g of 3-(2-aminoethyl)aminopropyltrimethoxysilane, as a further crosslinker and catalyst, are mixed in for 10 minutes.

After the mixture has been applied the tack-free time in air is approximately 20 minutes (23° C., 50% rh). The characteristics of this product are summarized in Table 1.

Comparative Example C8 (Not According to the Invention)

400 g (50.0 mmol) of a polypropylene glycol having an average molecular weight of 8000 g/mol are introduced, dewatered in vacuo at 100° C. for 1 h and admixed with 19.5 g (110 mmol) of isocyanatomethyltrimethoxysilane, and the mixture is stirred for 60 minutes until the isocyanate band is no longer present in the IR spectrum. The product is a clear, transparent polymer having a viscosity of 8.5 Pas.

In a laboratory planetary mixer, the silane-terminated polymer thus prepared is admixed at about 25° C. with 13.0 g of methyltrimethoxysilane and 195 g of precipitated, dried chalk (dried beforehand, water content <50 ppm) and processed to form a stiff paste.

Finally, 13.0 g of 3-(2-aminoethyl)aminopropyltrimethoxysilane, as a further crosslinker and catalyst, are mixed in for 10 minutes. After the mixture has been applied the tack-free time in air is approximately 3 minutes (23° C., 50% rh). The characteristics of this product are summarized in Table 1.

EXAMPLE 9

(According to the Invention)

400 g (50.0 mmol) of a polypropylene glycol having an average molecular weight of 8000 g/mol are introduced, dewatered in vacuo at 100° C. for 1 h and admixed with 15.9 g (110 mmol) of isocyanatomethyldimethylmethoxysilane, and the mixture is stirred for 60 minutes until the isocyanate band is no longer present in the IR spectrum. The product is a clear, transparent polymer having a viscosity of 85 Pas.

In a laboratory planetary mixer, the silane-terminated polymer thus prepared is admixed at about 25° C. with 13.0 g of methyltrimethoxysilane and 195 g of precipitated, dried chalk (dried beforehand, water content <50 ppm) and processed to form a stiff paste. Finally, 13.0 g of 3-(2-aminoethyl)aminopropyltrimethoxysilane, as a further crosslinker and catalyst, are mixed in for 10 minutes. After the mixture has been applied the tack-free time in air is approximately 15 minutes (23° C., 50% rh). The characteristics of this product are summarized in Table 1.

EXAMPLE 10

(According to the Invention)

400 g (50.0 mmol) of a polypropylene glycol having an average molecular weight of 8000 g/mol are introduced, dewatered in vacuo at 100° C. for 1 h and admixed with 17.3 g (110 mmol) of isocyanatomethyldimethylethoxysilane, and the mixture is stirred for 60 minutes until the isocyanate band is no longer present in the IR spectrum. The product is a clear, transparent polymer having a viscosity of 80 Pas.

In a laboratory planetary mixer, the silane-terminated polymer thus prepared is admixed at about 25° C. with 195 g of precipitated, dried chalk (dried beforehand, water content <50 ppm) and processed to form a stiff paste. Finally, 26.0 g of 3-(2-aminoethyl)aminopropyltriethoxysilane, as a further crosslinker and catalyst, are mixed in for 10 minutes. After the mixture has been applied the tack-free time in air is approximately 10 minutes (23° C., 50% rh). The characteristics of this product are summarized in Table 1.

The invention claimed is:

1. A crosslinkable polymer blend, comprising at least one polymer A having endgroups of the formula (1)

$$-L-CH_2-SiR^1_a(OR^2)_{3-a} \quad (1)$$

wherein

L is a divalent linking group selected from —O—CO—NH—, —N($R^3$)—CO—NH—, —S—CO—NH—, $R^1$ is an optionally halogen-substituted alkyl, cycloalkyl, alkenyl or aryl radical having 1–10 carbon atoms, $R^2$ is an alkyl radical having 1–6 carbon atoms or an ω-oxyalkylalkyl radical having a total of 2–10 carbon atoms, $R^3$ is hydrogen, an optionally halogen-substituted cyclic, linear or branched $C_1$ to $C_{18}$ alkyl or alkenyl radical or a $C_6$ to $C_{18}$ aryl radical, and a is an integer from 0 to 2, with the proviso that the fraction of the endgroups of the general formula (1) where a=2, relative to all the endgroups of the polymers present in the mixture which have alkoxysilane endgroups, is from 5% to 100%.

2. The polymer blend of claim 1, wherein the fraction of the endgroups of the general formula (1) where a=2, relative to all the endgroups of the polymers present in the polymer mixture which have alkoxysilane endgroups, is at least 50%.

3. The polymer blend of claim 1, wherein the radicals $R^1$ are independently methyl, ethyl or phenyl radicals.

4. The polymer blend of claim 2, wherein the radicals $R^1$ are independently methyl, ethyl or phenyl radicals.

5. The polymer blend of claim 1, wherein the radicals $R^2$ are independently methyl or ethyl radicals.

6. The polymer blend of claim 2, wherein the radicals $R^2$ are independently methyl or ethyl radicals.

7. The polymer blend of claim 3, wherein the radicals $R^2$ are independently methyl or ethyl radicals.

8. The polymer blend of claim 1, further comprising at least one organic amino compound as a basic catalyst (B).

9. The polymer blend of claim 3, further comprising at least one organic amino compound as a basic catalyst (B).

10. The polymer blend of claim 5, further comprising at least one organic amino compound as a basic catalyst (B).

TABLE 1

Properties of the one-component mixtures

| Characteristic | Comp. Ex. 3 | Comp. Ex. 4 | Ex. 5 | Comp. Ex. 6 | Ex. 7 | Comp. Ex. 8 | Ex. 9 | Ex. 10 |
|---|---|---|---|---|---|---|---|---|
| Skinning [min] | 5 | 120 | 25 | 5 | 20 | 3 | 15 | 10 |
| Tensile strength [MPa], DIN 53504 | 1.49 | 1.35 | 1.82 | 1.45 | 2.05 | 1.60 | 2.17 | 2.34 |
| Elongation at break [%], DIN 53504 | 396 | 422 | 635 | 220 | 475 | 120 | 465 | 498 |
| Stress at 100% elongation [MPa], DIN 53504 | 0.48 | 0.45 | 0.35 | 0.75 | 0.67 | 1.30 | 0.85 | 0.80 |
| Hardness [Shore A], DIN 53505 | 18 | 16 | 16 | 55 | 46 | 56 | 25 | 25 |

11. In an adhesive, sealant, coating, or moldable elastomer which is moisture curable and which contains a blend of one or more alkoxysilane-functional polymers, the improvement comprising selecting as said blend, a crosslinkable polymer blend of claim 1.

12. In an adhesive, sealant, coating, or moldable elastomer which is moisture curable and which contains a blend of one or more alkoxysilane-functional polymers, the improvement comprising selecting as said blend, a crosslinkable polymer blend of claim 2.

13. In an adhesive, sealant, coating, or moldable elastomer which is moisture curable and which contains a blend of one or more alkoxysilane-functional polymers, the improvement comprising selecting as said blend, a crosslinkable polymer blend of claim 3.

14. In an adhesive, sealant, coating, or moldable elastomer which is moisture curable and which contains a blend of one or more alkoxysilane-functional polymers, the improvement comprising selecting as said blend, a crosslinkable polymer blend of claim 5.

15. In an adhesive, sealant, coating, or moldable elastomer which is moisture curable and which contains a blend of one or more alkoxysilane-functional polymers, the improvement comprising selecting as said blend, a crosslinkable polymer blend of claim 8.

16. A process for the preparation of an alkoxysilane-functional polymer suitable for use in the crosslinkable polymer blend of claim 1, said process comprising reacting at least one isocyanatosilane of the formula (2)

$$OCN-CH_2-SiR^1_a(OR^2)_{3-a} \qquad (2)$$

with one or more prepolymers having at least one terminal isocyanate-reactive end group selected from the group consisting of OH, HNR$^3$, and HS, wherein $R^1$ is an alkyl radical having 1 to 6 carbon atoms or an ω-oxyalkyl radical having a total of 2 to 10 carbon atoms; and a is an integer from 0 to 2, with the proviso that the fraction of the isocyanatosilanes of the formula (2) where a=2 relative to all isocyanatosilanes which bear $SiR^1_a(OR^2)_{3-a}$ groups is from 5% to 100%.

17. The process of claim 16 wherein said prepolymer is a linear polymer selected from the group consisting of polysiloxanes, polysiloxane-urea/urethane copolymers, polyurethanes, polyureas, polyethers, polyesters, poly(meth)acrylates, polycarbonates, polystyrenes, polyamindes, polyvinyl esters, styrene/butadiene copolymers, and polyolefins.

18. The process of claim 17 wherein said prepolymer is α,ω-bis-terminated with a single type of isocyanate reactive end group.

19. A crosslinkable blend comprising at least one alkoxysilane-functional polymer prepared by the process of claim 16.

* * * * *